United States Patent [19]

Karnopp et al.

[11] Patent Number: 4,998,593
[45] Date of Patent: Mar. 12, 1991

[54] STEERING AND BRAKE CONTROLLING SYSTEM

[75] Inventors: Dean C. Karnopp; Yoshiyuki Yasui, both of Davis, Calif.

[73] Assignee: Aisin Seiki Kabushiki Kaisha, Kariya, Japan

[21] Appl. No.: 331,343

[22] Filed: Mar. 31, 1989

[51] Int. Cl.$^5$ .......................... B62D 5/00; B62D 6/00
[52] U.S. Cl. ...................................... 180/140; 180/141;
180/142; 180/79.1; 180/244; 280/91; 303/96;
303/700; 364/426.02
[58] Field of Search ............... 180/141, 142, 140, 132,
180/79.1, 233, 244; 280/91; 303/96, 97, 100;
364/426.02

[56] References Cited

U.S. PATENT DOCUMENTS

| | | | |
|---|---|---|---|
| 3,011,579 | 12/1961 | Milliken, Jr. et al. | 180/142 |
| 4,690,431 | 9/1987 | Ito et al. | 180/140 X |
| 4,706,771 | 11/1987 | Kawabe et al. | 180/142 |
| 4,706,978 | 11/1987 | Ito | 180/142 |
| 4,718,685 | 1/1988 | Kawabe et al. | 180/142 X |
| 4,722,545 | 2/1988 | Gretz et al. | 180/141 X |
| 4,765,433 | 8/1988 | Fujii et al. | 180/244 |
| 4,773,012 | 9/1988 | Ito et al. | 180/142 X |
| 4,840,389 | 6/1989 | Kawabe et al. | 180/140 X |

FOREIGN PATENT DOCUMENTS

| | | | |
|---|---|---|---|
| 122078 | 6/1986 | Japan | 180/79.1 |
| 200065 | 9/1986 | Japan | 180/140 |
| 4674 | 1/1987 | Japan | 180/142 |
| 34846 | 2/1987 | Japan | 180/79.1 |
| 160960 | 7/1987 | Japan | 180/79.1 |
| 258867 | 11/1987 | Japan | 180/140 |
| 207732 | 8/1988 | Japan | 180/233 |
| 235173 | 9/1988 | Japan | 180/242 |
| 11538 | 4/1989 | Japan | 180/244 |
| 103579 | 4/1989 | Japan | 180/79.1 |
| 727169 | 4/1980 | U.S.S.R. | 180/79.1 |

Primary Examiner—Mitchell J. Hill
Attorney, Agent, or Firm—Burns, Doane, Swecker & Mathis

[57] ABSTRACT

Steering and braking are coordinated and controlled according to a sensed yaw rate error or lateral acceleration error to increase vehicle stability without increasing braking distance. A desired yaw rate or lateral acceleration rate is computed from the vehicle velocity and the steering wheel angle. If the yaw rate or the lateral acceleration is excessive, indicating instability, and the brakes are being operated, then both steering and braking are controlled to reduce the yaw rate or lateral acceleration rate. In all other cases, steering control alone is performed. The yaw rate or lateral acceleration rate is reduced under steering control by adjusting wheel positions in a direction opposite the direction of yaw or lateral acceleration. The control system of the present invention is applicable to both two-wheel and four-wheel steering and braking. The yaw rate or lateral acceleration is further reduced under braking control by decreasing brake pressure on a side of the vehicle corresponding to the direction of yaw or lateral acceleration and increasing brake pressure on the opposite side of the vehicle. In the case of anti-lock brakes, pressure is not increased beyond a slip rate threshold. Rather than controlling brake pressure, the slip rate threshold itself may be controlled in like manner to reduce the yaw rate or lateral acceleration.

21 Claims, 10 Drawing Sheets

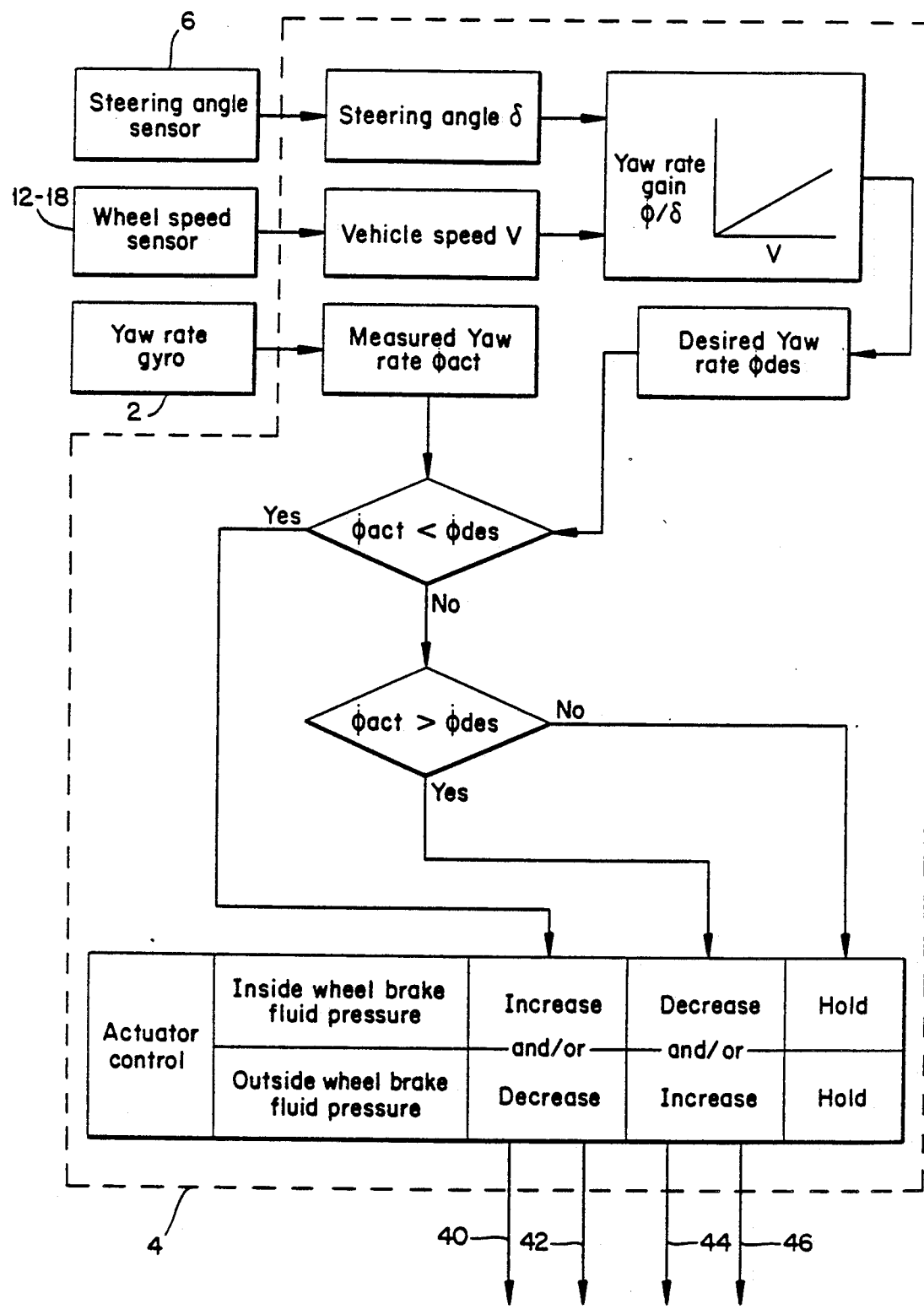

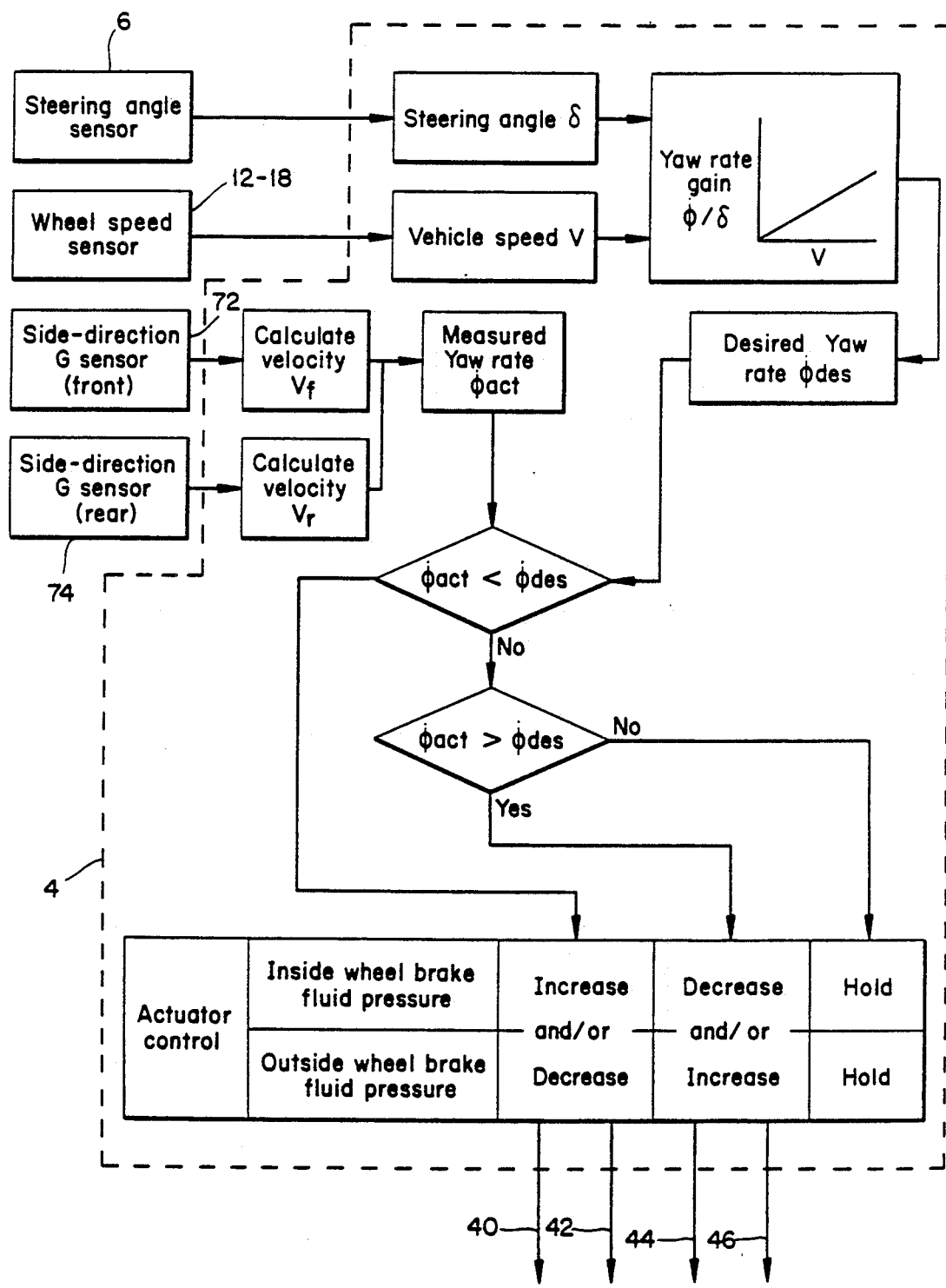

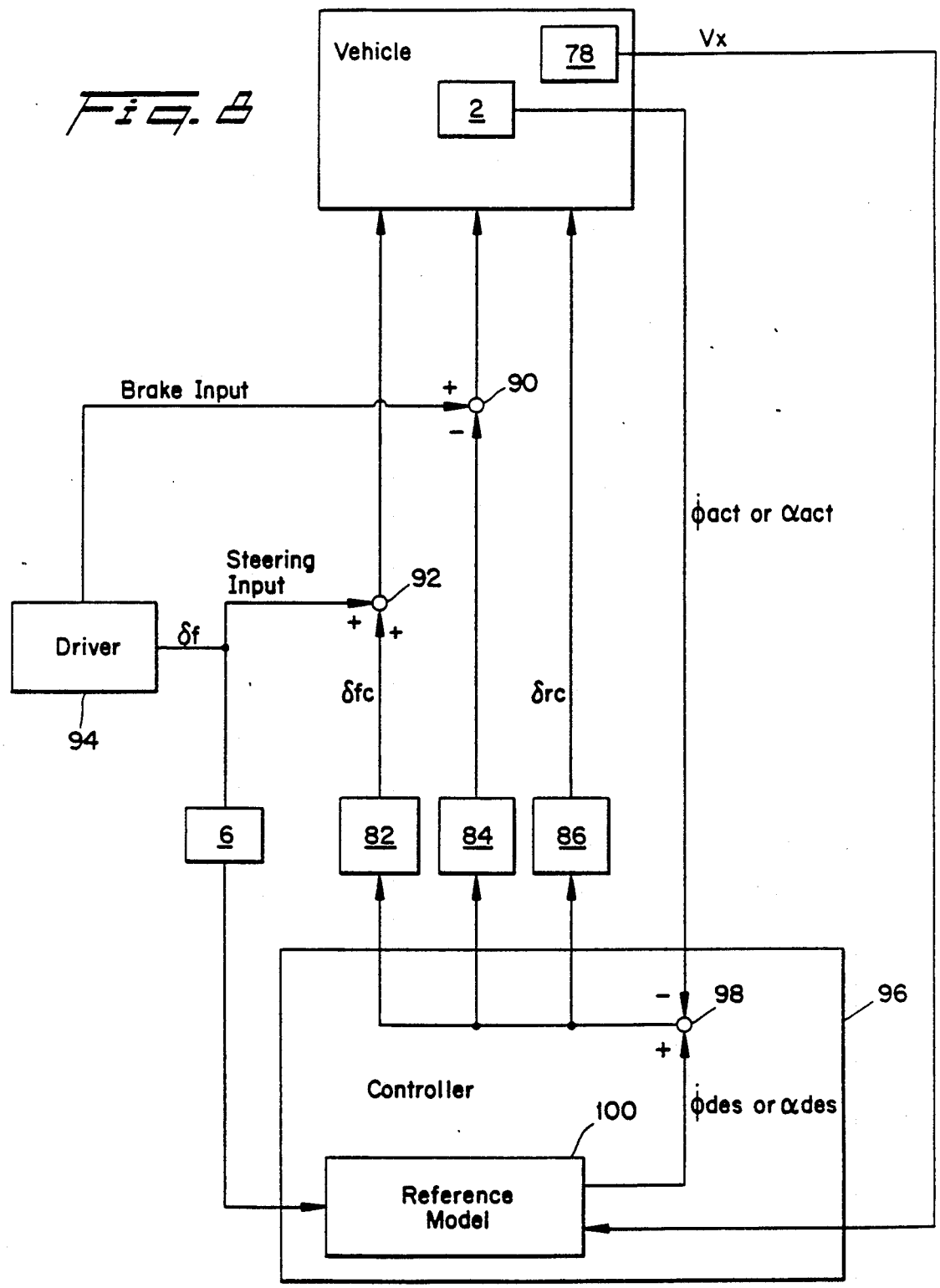

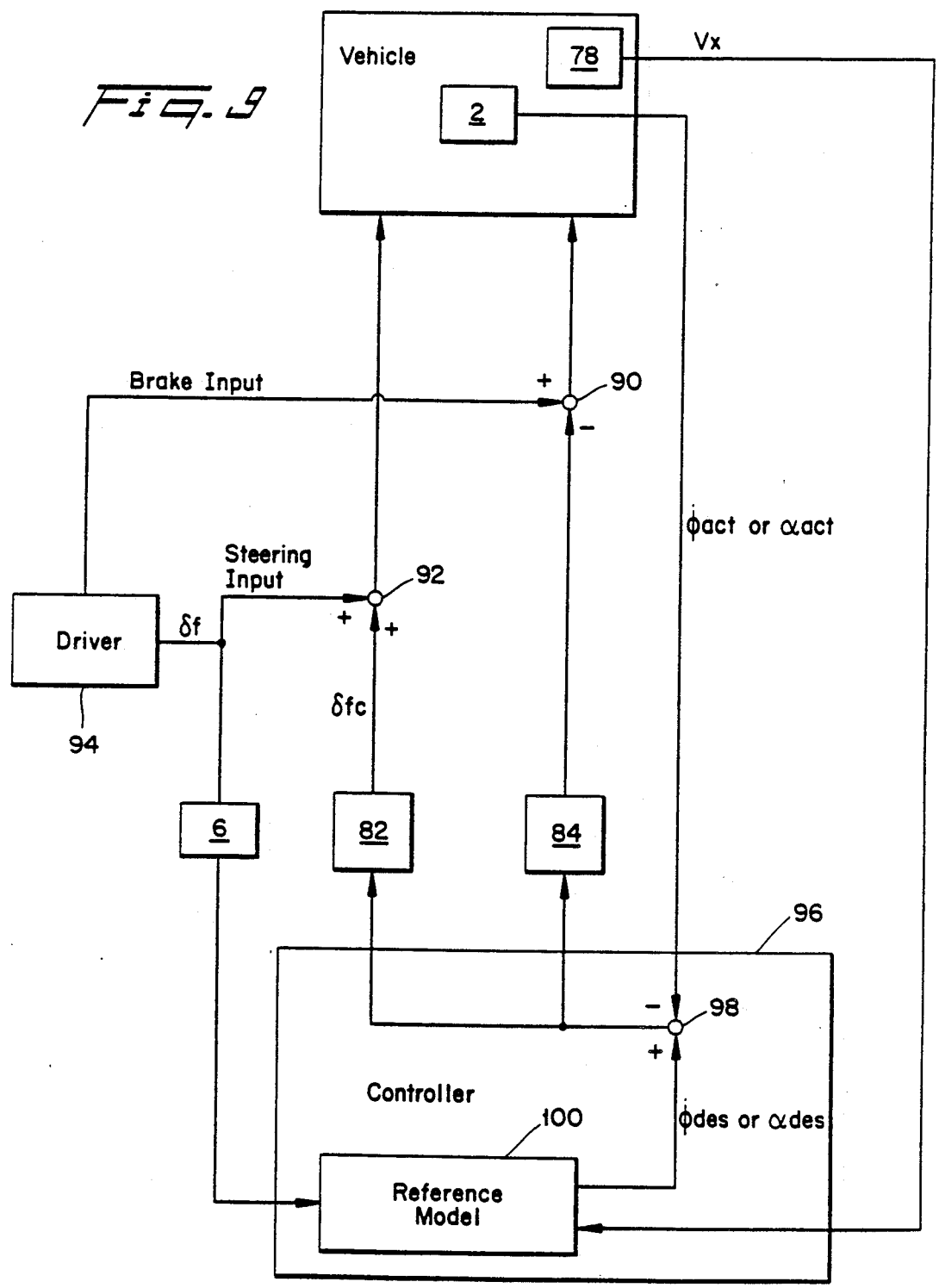

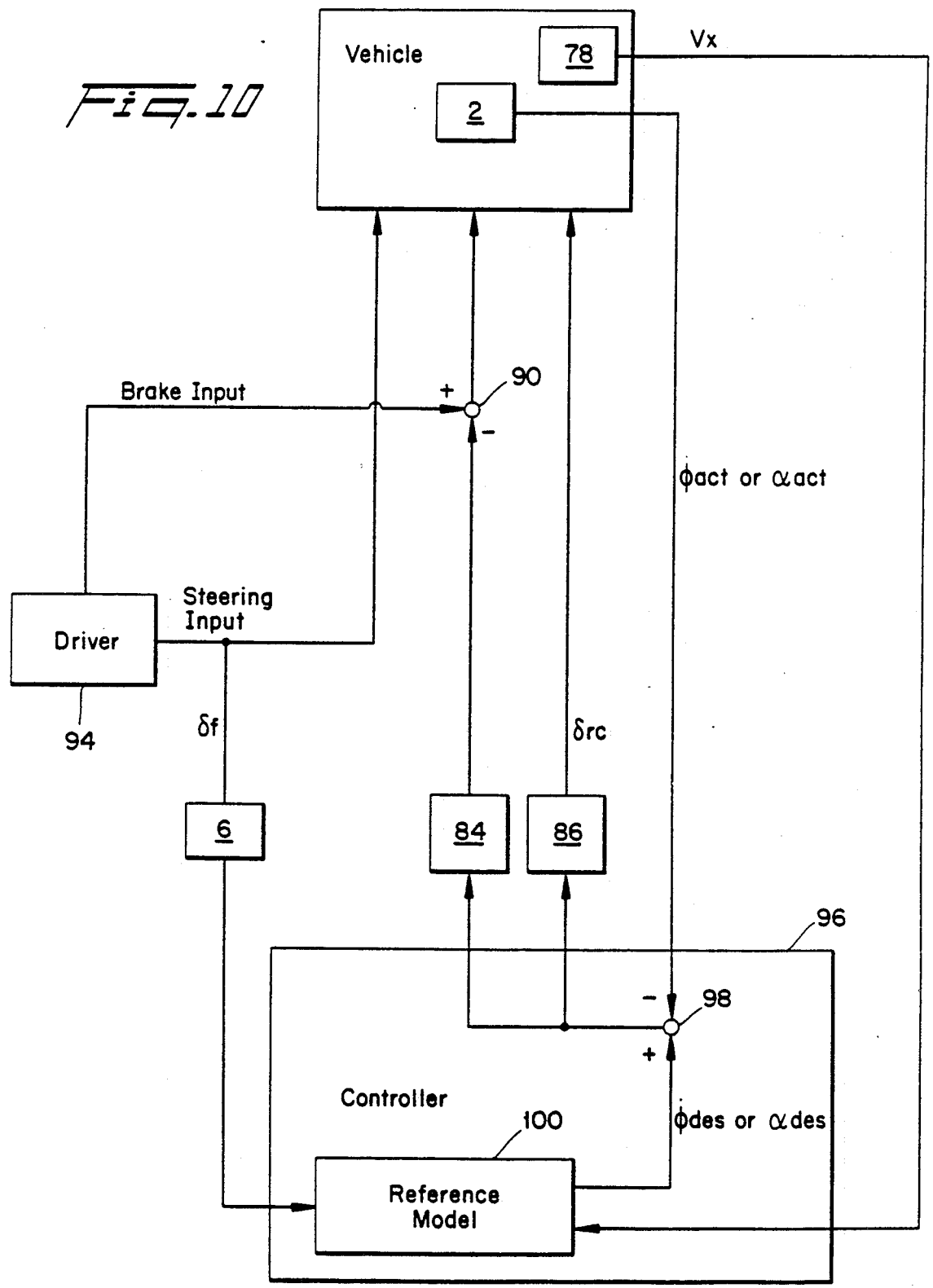

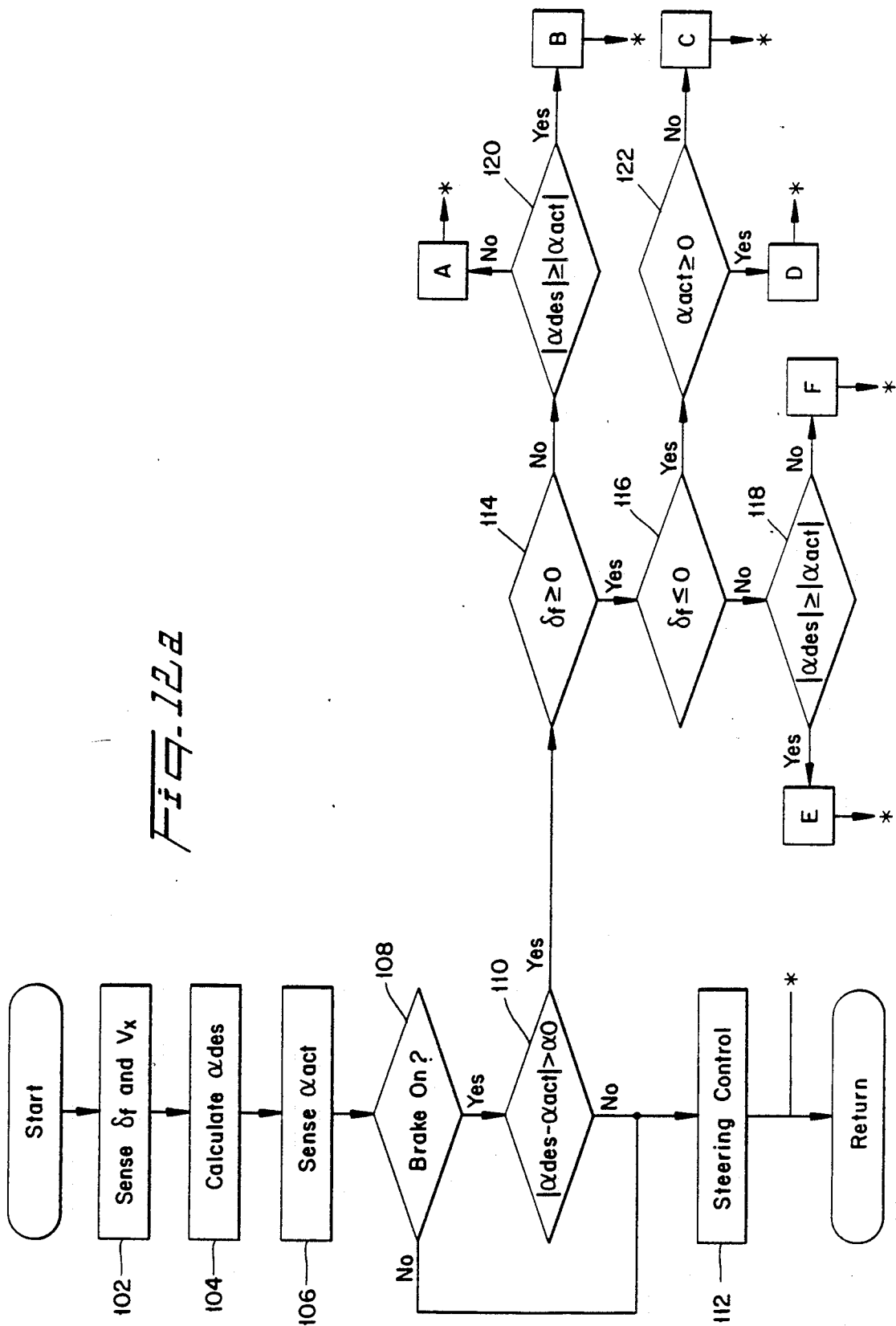

Fig.11b

|  | A, C, E | B, D, F |
|---|---|---|
| Steering Control | Modify Front AND/OR Rear Steering Angle by $\delta_{fc}$ and $\delta_{rc}$, respectively | |
| Brake Control | Reduce $P_{fl}, P_{rl}$<br>Hold or Increase $P_{fr}, P_{rr}$<br>OR<br>Reduce $P_{rl}$<br>Hold or Increase $P_{rr}$<br>OR<br>Reduce $\lambda_{fl}, \lambda_{rl}$<br>Hold or Increase $\lambda_{fr}, \lambda_{rr}$<br>OR<br>Reduce $\lambda_{rl}$<br>Hold or Increase $\lambda_{rr}$ | Reduce $P_{fr}, P_{rr}$<br>Hold or Increase $P_{fl}, P_{rl}$<br>OR<br>Reduce $P_{rr}$<br>Hold or Increase $P_{rl}$<br>OR<br>Reduce $\lambda_{fr}, \lambda_{rr}$<br>Hold or Increase $\lambda_{fl}, \lambda_{rl}$<br>OR<br>Reduce $\lambda_{rr}$<br>Hold or Increase $\lambda_{rl}$ |

Fig.12b

|  | A, C, E | B, D, F |
|---|---|---|
| Steering Control | Modify Front AND/OR Rear Steering Angle by $\delta_{fc}$ and $\delta_{rc}$, respectively | |
| Brake Control | Reduce $P_{fl}, P_{rl}$<br>Hold or Increase $P_{fr}, P_{rr}$<br>OR<br>Reduce $P_{rl}$<br>Hold or Increase $P_{rr}$<br>OR<br>Reduce $\lambda_{fl}, \lambda_{rl}$<br>Hold or Increase $\lambda_{fr}, \lambda_{rr}$<br>OR<br>Reduce $\lambda_{rl}$<br>Hold or Increase $\lambda_{rr}$ | Reduce $P_{fr}, P_{rr}$<br>Hold or Increase $P_{fl}, P_{rl}$<br>OR<br>Reduce $P_{rr}$<br>Hold or Increase $P_{rl}$<br>OR<br>Reduce $\lambda_{fr}, \lambda_{rr}$<br>Hold or Increase $\lambda_{fl}, \lambda_{rl}$<br>OR<br>Reduce $\lambda_{rr}$<br>Hold or Increase $\lambda_{rl}$ |

STEERING AND BRAKE CONTROLLING SYSTEM

CROSS-REFERENCE TO RELATED APPLICATIONS

The present application is related to co-pending U.S. application Ser. No. 206,735, filed June 15, 1988 in the names of the present inventors.

BACKGROUND OF THE INVENTION

1. Field of the Invention

The present invention generally relates to an apparatus and method for controlling vehicle motion. More specifically, the invention relates to an apparatus for improving vehicle stability by controlling the brake torque of a vehicle during, for example, cornering.

2. Description of the Related Art

During vehicle motion such as cornering, both longitudinal forces (i.e., front to back) and lateral forces (i.e., side to side) influence the lateral and longitudinal behavior of the vehicle, as noted in the article "A Study On Vehicle Turning Behavior in Acceleration and in Braking", SAE Technical Paper No. 852184, pages 75–86, by Masato Abe. As further noted in the article, complicated equations of motion are involved in describing the combined lateral and longitudinal behavior of the vehicle, because many of the steady state equilibrium conditions which may exist during a constant speed mode of operation might not exist during vehicle braking or acceleration.

The varying longitudinal forces which affect vehicle stability during braking or acceleration have a tendency to cause the rear wheels of a vehicle to lock during braking due to a varying decrease in the rear wheel load. In order to prevent this rear wheel lock from occurring, some prior art brake control systems include a proportioning valve to adjust the amount of braking in proportion to the longitudinally changing loads of the front of the vehicle relative to the back of the vehicle.

Although the use of such a proportioning valve helps to prevent rear wheel lock from occurring during braking due to longitudinally changing load forces, it does not sufficiently adjust the braking action at the vehicle wheels to compensate for vehicle load changes that are due to lateral, i.e., side to side, forces. When a vehicle is undergoing a cornering maneuver, for example, there is not only a longitudinal load shift in a tangential direction to the vehicle's path of motion, but there is also a lateral load shift in a direction which is normal to the vehicle's path of motion. Such a lateral load shift is transferred, for example, from the wheels located on the inside of the curve in the vehicle's path to the wheels located on the outside of the curve in the vehicle's path. It is this lateral load shift which urges the vehicle out of its current path as defined by an existing radius of curvature, and into an oversteer or an understeer condition.

In the aforementioned article by Masato Abe, a study of the affect of acceleration and braking on vehicle turning behavior is presented. In this study, equilibrium equations of vehicle motion for constant lateral and longitudinal accelerations which describe the vehicle turning behavior during acceleration and braking are developed. The equations derived are used to obtain the radii of curvature of the vehicle path versus vehicle forward speed during constant acceleration or braking in turns. The vehicle turning behavior is also described by a characteristic line representing the lateral acceleration versus the longitudinal acceleration for a circular turning maneuver. For example, FIGS. 5–7 of the article reflect that for a given steering wheel angle, increased deceleration due to, for example, braking action (as reflected by negative acceleration in the FIGS. 5–7), results in a change from an understeer condition (i.e., an increase in turning radius), to an increasingly severe oversteer condition (i.e., a decrease in turning radius), with increased vehicle speed.

Although the prior art has recognized that longitudinal forces as well as lateral forces affect the vehicle motion during cornering, there is a need to provide a vehicle motion control system which will actually compensate for the lateral forces that detrimentally influence vehicle stability during the course of vehicle motion.

SUMMARY OF THE INVENTION

Accordingly, it is an object of the present invention to overcome the deficiencies of the prior art by providing a novel apparatus and method for improving vehicle stability. In accordance with the invention, vehicle motion is controlled through the use of a steering and brake controlling system which compensates for the influence of lateral forces on the vehicle.

More specifically, an apparatus for controlling vehicle motion is provided which independently controls steering angle and/or braking torque in response to a sensed lateral acceleration or actual yaw rate. In a preferred embodiment, the apparatus for controlling motion includes a means for measuring the lateral acceleration or actual yaw rate of the vehicle. The apparatus also includes a means for determining a desired lateral acceleration or yaw rate of the vehicle and for producing an output signal in response to a comparison of the desired lateral acceleration or yaw rate with the actual lateral acceleration or yaw rate. The desired lateral acceleration or yaw rate is determined on the basis of the vehicle's steering angle and velocity. Accordingly, a first sensor means is provided for detecting the steering angle at which the vehicle is turning, and a second sensor means is provided for detecting vehicle speed. The second sensor means includes a plurality of wheel speed sensors for detecting the speed of rotation of each vehicle wheel independently so that an accurate indication of vehicle speed can be obtained from the average of the wheel speed sensor outputs.

The output signal produced in response to the comparison of a desired lateral acceleration or yaw rate with an actual lateral acceleration or yaw rate is applied to a steering and braking control means. Based on this output signal, the steering and braking control means maintains the handling characteristics of the vehicle neutral (i.e., prevents oversteer or understeer) or, at the most, permits only negligible understeer to occur during a maneuver such as cornering.

More specifically, if there is a discrepancy between the measured lateral acceleration or yaw rate and the desired lateral acceleration or yaw rate, the existence of lateral forces which could detrimentally influence vehicle motion is indicated. If the measured lateral acceleration or yaw rate is determined to be less than the desired lateral acceleration or yaw rate, the brake controlling means will increase the brake force applied to the vehicle's wheels which face the inside of a curve in a vehicle's path and/or decrease the brake force applied to the vehicle's wheels which face the outside of the curve. On the other hand, if the measured lateral acceleration or yaw rate is greater than the desired lateral acceleration or yaw rate, the brake controlling means will decrease the brake force applied to the inside wheels of the vehicle and/or increase the brake force applied to the outside wheels. However, if the output signal indicates that the actual lateral acceleration or yaw rate and the desired lateral acceleration or yaw rate are equal, then no action is taken.

Additionally, an error in lateral acceleration or yaw rate is reduced under steering control by adjusting wheel positions in a direction opposite the direction of lateral acceleration or yaw.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein:

FIG. 2 shows a flow chart for the system shown in FIG. 1;

FIG. 6 including

FIG. 8 is a block diagram of a front and rear wheel steering control and brake control system;

FIG. 9 is a block diagram of a front wheel steering control and brake control system;

FIG. 10 is a block diagram of a rear wheel steering control and brake control system;

FIG. 11 including FIGS. 11a and 11b is a flow chart of steering and brake control using yaw rate as the control variable; and FIG. 12 including FIGS. 12a and 12b is a flow chart of steering and brake control using lateral acceleration as the control variable.

DESCRIPTION OF THE PREFERRED EMBODIMENTS

Figure 1:
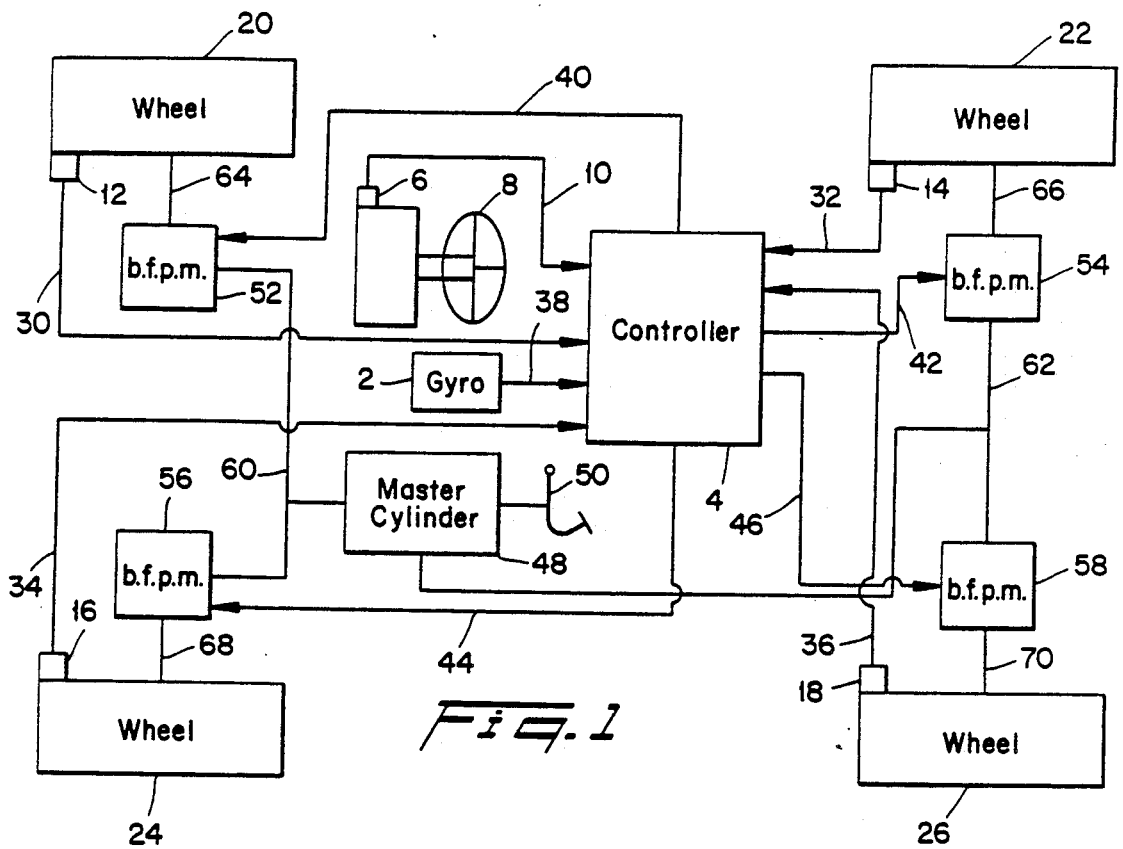
FIG. 1 shows a schematic diagram of one embodiment of a brake controlling system for stabilizing motion in a motor vehicle.

FIG. 1 shows a schematic diagram of a preferred embodiment of a brake controlling system for stabilizing vehicle motion according to the present invention. The FIG. 1 apparatus includes a means for measuring an actual yaw rate of a vehicle which includes a yaw rate gyro 2. The yaw rate gyro is arranged on or near the center of gravity of the motor vehicle body and is responsive to the influence of destabilizing forces on the vehicle.

The FIG. 1 apparatus also includes a means for determining a desired yaw rate of the vehicle and for producing an output signal in response to a comparison of the desired yaw rate and the actual yaw rate. The means for determining a desired yaw rate includes a controller 4 which responds to input signals from a first sensor means for detecting a steering angle of the vehicle and a second sensor means for detecting vehicle speed. The first sensor means includes a steering angle sensor 6 associated with a vehicle steering wheel 8. The second sensor means includes the wheel speed sensors 12, 14, 16 and 18 which are associated with the individual wheels 20, 22, 24 and 26, respectively. The steering angle sensor 6 provides an input signal to the controller 4 via the line 10, which is indicative of a turning angle of the vehicle. The wheel speed sensors 12, 14, 16 and 18 provide the controller 4 with an indication of the individual wheel speed for each of the wheels 20, 22, 24 and 26, via the lines 30, 32, 34 and 36, respectively.

The controller 4 also receives the measured yaw rate from the yaw rate gyro 2 via the line 38 so that it can then produce an output signal in response to a comparison of the desired yaw rate with the actual yaw rate. The output signal is supplied as an input to a brake controlling means via the output lines 40, 42, 44 and 46 of the controller 4.

Referring to FIG. 1, the brake controlling means includes a brake master cylinder 48 which is associated with a manually operated brake pedal 50. The brake master cylinder in turn controls four brake fluid pressure modulators 52, 54, 56 and 58 via the lines 60 and 62, in response to depression of the brake pedal. The brake fluid pressure modulators increase or decrease the brake fluid pressure in each of the brake fluid lines 64, 66, 68 and 70, respectively. An increase or decrease in each of the brake fluid lines 64, 66, 68 and 70 will in turn increase or decrease the braking action of brake actuators in known fashion at each of the wheels 20, 22, 24, and 26, respectively.

Based on the result of the comparison performed within the controller 4, the brake fluid pressure in each of the brake fluid lines 64, 66, 68 and 70 is adjusted to maintain vehicle stability despite the occurrence of lateral forces during, for example, vehicle cornering. The brake controlling system of FIG. 1 can also be adapted to incorporate a known proportioning valve so that longitudinal forces which may affect vehicle stability will simultaneously be compensated.

A more specific discussion of the operation of the FIG. 1 apparatus will now be provided in conjunction with the flow chart of FIG. 2. The controller 4 of FIG. 1 receives the actual yaw rate from the yaw rate gyro 2 as mentioned above. In order to perform the aforementioned comparison of the actual yaw rate with the desired yaw rate, the controller 4 must first determine the desired yaw rate. Accordingly, the controller 4 receives an individual wheel speed signal from each of the wheel speed sensors 12, 14, 16 and 18, and calculates the vehicle speed, designated V, from the average of the values received as shown in FIG. 2. Using the calculated vehicle speed V in conjunction with the vehicle steering angle, designated δ as received from the steering angle sensor 6, the controller 4 calculates a desired yaw rate designated $\phi_{des}$ in accordance with the following equation:

$$\frac{\phi_{des}}{\delta} = \frac{V}{L + K_{us}\frac{V^2}{g}} \qquad (1)$$

wherein L corresponds to the wheelbase of the vehicle; g, corresponds to the acceleration due to gravity, (i.e., 9.8 m/s$^2$); and, $K_{us}$ corresponds to the understeer coefficient, (i.e., stability factor), of the vehicle. These constants provide the linear gain depicted in the box entitled "yaw rate gain" of FIG. 2. In order to maintain neutral handling characteristics of the vehicle, (i.e., avoid an oversteer or an understeer condition while cornering), or at the least, limit the handling characteristics to a negligible understeer, $K_{us}$ should be chosen to be within the range of 0 to 1 degree.

The desired yaw rate is periodically updated by the controller at a rate defined by the controller's clock. The updated desired yaw rate is then compared with a current measure of the actual yaw rate in the controller 4 so that vehicle stability will be maintained during vehicle motion. During the comparison, if the measured yaw rate does not equal the desired yaw rate, the controller 4 outputs signals via the lines 40, 42, 44 and 46 to the brake fluid pressure modulators 52, 54, 56 and 58 of FIG. 1, respectively. The brake fluid pressure modulators in turn modify the brake fluid pressure in each of the lines 64, 66, 68 and 70, respectively. If however, the measured yaw rate is equal to the desired yaw rate, no action is taken. Accordingly, the controller 4 is placed in a "hold" status as indicated in FIG. 2 so that the brake fluid pressure modulators 52, 54, 56 and 58 will maintain the current stabilized state of the vehicle.

More specifically, if the measured yaw rate is less than the desired yaw rate while the vehicle is, for example, undergoing a cornering maneuver, the controller 4 will signal the brake fluid pressure modulators to increase the braking force applied by brake actuators to the wheels located on the inside of the curve in the vehicle's path of travel and/or to decrease the braking force applied by brake actuators to the wheels located on the outside of the curve as shown in FIG. 2. Referring to the FIG. 1 apparatus, if, for example, the wheels 24 and 26 are on the inside of a curve being travelled by the vehicle, the controller 4 would signal the brake fluid pressure modulators 56 and 58 to increase the braking force applied to the wheels 24 and 26 via the lines 68 and 70, and/or signal the brake fluid pressure modulators 52 and 54 to decrease the braking force applied to the wheels 20 and 22 via the lines 64 and 66. This relative adjustment between the braking force applied to the wheels on one side of the vehicle versus the braking force applied to the wheels on the other side of the vehicle would be made in proportion to the magnitude of the difference between the measured yaw rate and the desired yaw rate, and would continue until these latter two values were once again equal. As can be seen from the above discussion, the relative braking force applied to the wheels 20, 22, 24 and 26 in order to maintain vehicle stability, can be achieved solely by compensating the braking force applied to either side of the vehicle or alternatively, can be achieved by simultaneously compensating the braking force applied to both sides of the vehicle.

If the measured yaw rate is determined by the controller 4 to be greater than the desired yaw rate as shown in FIG. 2, the controller 4 would signal the brake fluid pressure modulators 52, 54, 56 and 58 of FIG. 1 to decrease the braking force applied by brake actuators to the wheels on the inside of the curve in the vehicle's path of travel and/or to increase the braking force applied by brake actuators to the wheels on the outside of the curve. In the aforementioned example, the controller 4 would thus signal the brake fluid pressure modulators 56 and 58 to decrease the braking force applied to the wheels 24 and 26, and/or signal the brake fluid pressure modulators 52 and 54 to increase the braking force applied to the wheels 20 and 22. As noted previously, the relative braking force needed to obtain stabilized vehicle motion, could thus be obtained solely by compensating the braking force applied to the wheels on either side of the vehicle or alternatively, could be obtained by simultaneously compensating the braking force applied to the wheels on both sides of the vehicle.

By the above-described brake controlling system, vehicle motion can be stabilized against the influence of lateral load changes. Because the output signals from the controller 4 are applied to the brake fluid pressure modulators in response to yaw rate feedback independently of the brake master cylinder, vehicle stability can be maintained even when there is no brake pedal input. For example, during acceleration while in a cornering maneuver, the controller 4 would compensate for any lateral forces which might otherwise create an oversteer or an understeer condition. In addition, by including a known proportioning valve into the FIG. 1 brake controlling system as noted previously, longitudinal load forces affecting vehicle stability could be compensated simultaneously so that complete lateral and longitudinal stabilization would be obtained during vehicle motion.

Figure 3:
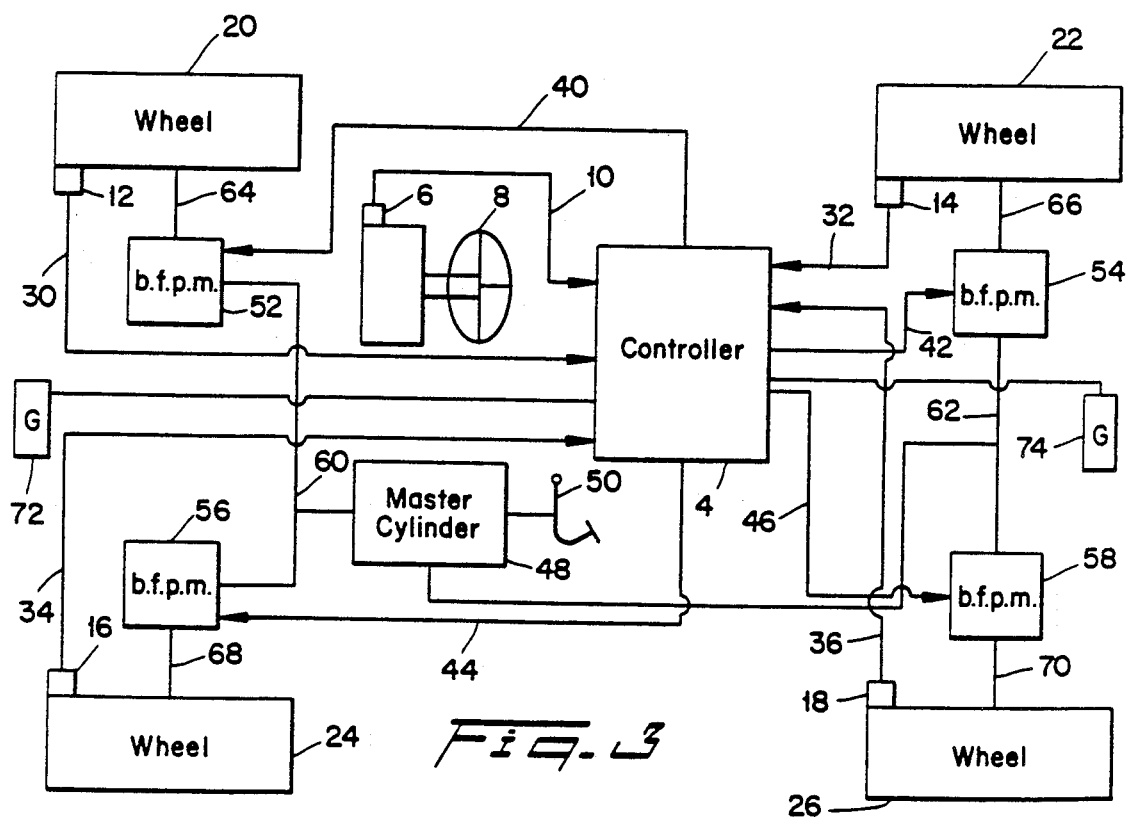
FIG. 3 shows a second embodiment of a brake controlling system for stabilizing motion in a motor vehicle.

Referring now to FIG. 3, a second embodiment of the present invention is shown wherein like elements with respect to FIG. 1 are assigned like numerals. In FIG. 3, the single yaw rate gyro of FIG. 1 is replaced with two side-direction G sensors, 72 and 74, for sensing G forces on the vehicle. As opposed to being placed on or near the vehicle body's center of gravity, the two side-direction G sensors are placed at the center of gravity of each of the front and rear ends of the motor vehicle body, respectively.

Figure 4:
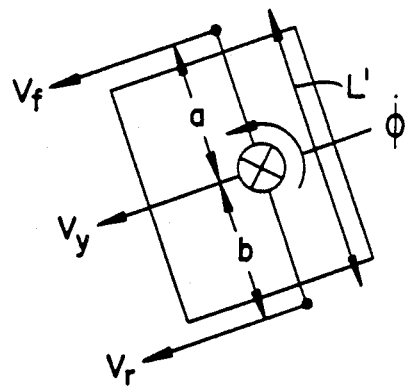
FIG. 4 shows a diagram of the forces used to calculate the yaw rate from the sensors used in FIG. 3; and, FIG. 5 shows a flow chart for the system shown in FIG. 3.

The actual yaw rate in the FIG. 3 embodiment is measured in accordance with the diagram shown in FIG. 4 as follows:

$$\phi_{act} = \frac{v_f - v_r}{L'} \quad (2)$$

wherein $v_f$ is the velocity component of the vehicle in a direction perpendicular to the travelling direction of the vehicle, and at the position of the side-direction G sensor 72 located at the front end of the vehicle as shown in FIG. 4; $v_r$ is the velocity component of the vehicle in a direction perpendicular to the travelling direction of the vehicle, and at the position of the side-direction G sensor 74 located at the rear end of the vehicle; and, $L'$ is a value corresponding to the distance between the side-direction G sensors.

The above equation for measuring the actual yaw rate is obtained by noting the existence of the following conditions in the FIG. 4 diagram:

$$v_f = v_y + a\phi_{act} \quad (3)$$

$$v_r = v_y - b\phi_{act} \quad (4)$$

wherein a is the distance between the position of the side-direction G sensor 72 located at the front end of the motor vehicle body and the vehicle body's center of gravity; $v_y$ is the velocity component of the vehicle in a direction perpendicular to a travelling direction of the vehicle, and at the position of the center of gravity of the motor vehicle body; and, wherein b is the distance between the position of the side-direction G sensor 74 located at the rear end of the motor vehicle body and the vehicle body's center of gravity.

Equations (3) and (4) can be solved simultaneously to provide the following equation:

$$v_f - v_r = (a+b)\phi_{act} \quad (5)$$

Rearranging this equation, the above-noted equation (2) can be obtained as follows:

$$\phi_{act} = \frac{v_f - v_r}{a+b} = \frac{v_f - v_r}{L}$$

The operation of the FIG. 3 embodiment will now be discussed more specifically in conjunction with the flow chart of FIG. 5. For the most part, the operation of the FIG. 3 embodiment can be seen to correspond to that of FIG. 1 with the exception that the controller 4 of FIG. 3 receives two inputs from the side-direction G sensors, 72 and 74. As shown in FIG. 5, these inputs are used to calculate $v_f$ and $v_r$ as discussed above. Using the equation (2) above, the actual yaw rate is then determined by the controller 4 and compared with the desired yaw rate as discussed previously.

As shown in FIG. 5, when the measured yaw rate is determined to be less than the desired yaw rate while the vehicle is undergoing, for example, a cornering maneuver, the controller 4 will signal the brake fluid pressure modulators to increase the braking force applied by brake actuators to the wheels located on the inside of the curve in the vehicle's path and/or to decrease the braking force applied by brake actuators to the wheels located on the outside of the curve. If the measured yaw rate is determined by the controller 4 to be greater than the desired yaw rate, then the controller 4 would signal the brake fluid pressure modulators to decrease the braking force applied by brake actuators to the wheels located on the inside of the curve in the vehicle's path of travel and/or to increase the braking force applied by brake actuators to the wheels located on the outside of the curve. If the measured yaw rate and the desired yaw rate are equal, the braking force actuators are not compensated by an output from the controller 4.

In both the FIG. 1 and FIG. 3 embodiments discussed above, it should be noted that because the rear wheels of a vehicle are generally not used for steering, the brake fluid pressure modulators arranged in the rear brake fluid lines could be eliminated with only minimal effect on the lateral stability of the vehicle.

In the braking control system described so far, since brake pressure of half of the brakes is reduced in order to decrease lateral acceleration or yaw moment, braking distance is increased. According to the control system of a further embodiment to be described next, steering control and braking control are coordinated to increase vehicle stability without increasing braking distance. Such a control system is applicable to both two-wheel and four-wheel steering and braking and is particularly useful when the coefficient of friction of a road surface differs on opposite sides of the vehicle.

Figure 6A:
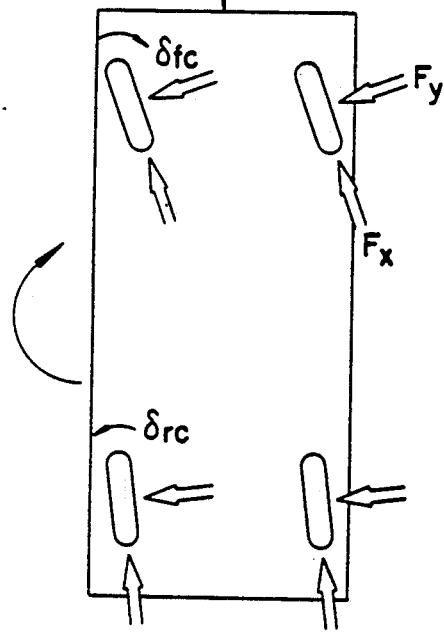
FIGS. 6a and 6b is a diagram of an example of coordinated steering and braking control to increase vehicle stability without increasing braking distance.

Referring now to FIG. 6a, it may be seen how steering control and braking control are coordinated to stabilize the vehicle without increasing braking distance. In the example illustrated, the vehicle is negotiating a turn to the left with an oversteer condition existing because of excessive lateral acceleration or yaw rate. In the previously described braking control method, because brake pressure was increased on one side of the vehicle but decreased on the other side of the vehicle in order to compensate for excess yaw rate, the braking distance was increased. In the present embodiment, excess yaw rate is compensated for through a combination of steering control and braking control with the result that the vehicle may be stabilized without increasing braking distance. This is accomplished in the following manner.

Once a lateral acceleration or yaw rate error has been determined as previously described, one or both of a steering correction factor $\delta_{fc}$ for the front wheels and $\delta_{rc}$ for the rear wheels are computed according to the following equations depending on whether 2-wheel or 4-wheel steering is employed:

$$\delta_{fc} = \kappa_1(\phi_{des} - \phi_{act}) \text{ or } \delta_{fc} = \kappa_2(\alpha_{des} - \alpha_{act})$$

$$\delta_{rc} = \kappa_3(\phi_{des} - \phi_{act}) \text{ or } \delta_{rc} = \kappa_4(\alpha_{des} - \alpha_{act})$$

Figure 6B:
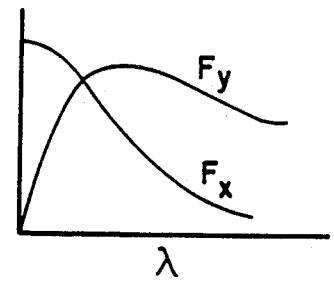
Figure 7:
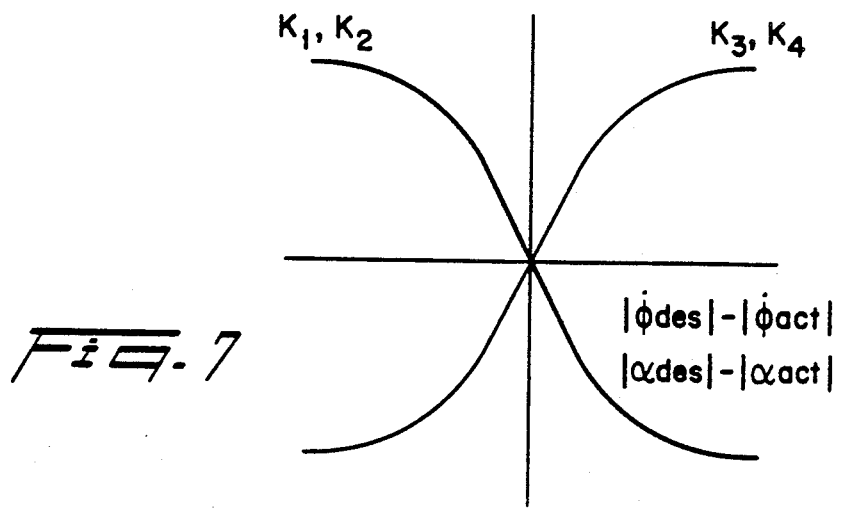
FIG. 7 is a graph showing generally the relationship between certain proportionality factors employed in the present invention and their related physical quantities.

Using the convention that a rightward steering angle or steering correction factor is positive and leftward negative, and likewise that a rightward lateral acceleration or yaw rate is positive and leftward negative, the graphs of the proportionality factors $K_1$-$K_4$ preferably have a shape as shown in FIG. 7. Returning to FIG. 6a, the steering correction factor or factors thus computed are applied to the vehicle wheels to reduce lateral acceleration or yaw moment, leaving a reduced moment to be compensated for by braking control. As seen in the graph of accompanying FIG. 6b and as is well-known in the art, lateral forces may be influenced by controlling the longitudinal slip of the vehicle's tires.

Referring to FIG. 8, the mechanism whereby steering control and braking control are coordinated may be seen to additionally include, besides those elements already described in connection with FIG. 1, a steering angle regulating system 82 and a rear wheel steering system 86. A desired lateral acceleration or yaw rate is calculated according to a reference model 100 using vehicle speed $V_x$ sensed by a vehicle speed sensor 78 and the steering wheel angle $\delta_f$ sensed by the steering angle sensor 6. For example, a desired acceleration $\delta_{des}$ or a desired yaw rate $\phi_{des}$ may be calculated according to the equations:

$$\phi_{des} = \frac{V_x}{L + K_{us} V_x^2/g} * \delta_f/R_g$$

$$\alpha_{des} = \frac{V_x^2}{gL + K_{us} V_x^2} * \delta_f/R_g$$

where L is the wheel base of the vehicle, g is the acceleration of gravity, $R_g$ is a steering gear ratio and $K_{us}$ is the understeer coefficient. A desired lateral acceleration or yaw rate computed by the reference model 100 is compared to the actual lateral acceleration or yaw rate, measured by the lateral acceleration or yaw rate sensor 20, at a summing junction 98 to arrive at a lateral acceleration or yaw rate error that acts as a controlling input to both the steering systems 82 and 86 and the brake fluid pressure regulating system 84. The steering angle regulating system 92 may take any of numerous forms including a servo control system or a pulse control system using a hydraulic power cylinder or a DC motor as an actuator. As seen in FIG. 7, the steering correction factor $\delta_{fc}$ may take either sign, and is cumulatively summed with the steering input $\delta_f$ from the driver 94 at a summing junction 92. The rear wheel steering system 86 may be similarly constituted. Since the driver 94 does not control rear wheel steering, however, no summing junction is necessary.

The brake fluid pressure regulating system 84 may take one of at least two possible forms. In a first arrangement, brake fluid pressure P is modified. In a second arrangement, the slip rate threshold $\lambda$ for anti-lock braking is controlled. The particulars of the braking control algorithm in the present embodiment will be described next in reference to FIG. 11. It should first be noted, however, that only one of the steering angle regulating system 82 and the rear wheel steering system 86 is necessary according to the principles of the present embodiment. The rear wheel steering system 86 may be eliminated as shown in FIG. 9. Alternatively, the steering angle regulating system 82 may be eliminated as shown in FIG. 10, resulting in the steering input $\delta_f$ being fed directly to the vehicle 88 instead of to the summing junction 92 as in FIG. 8.

Figure 11A:
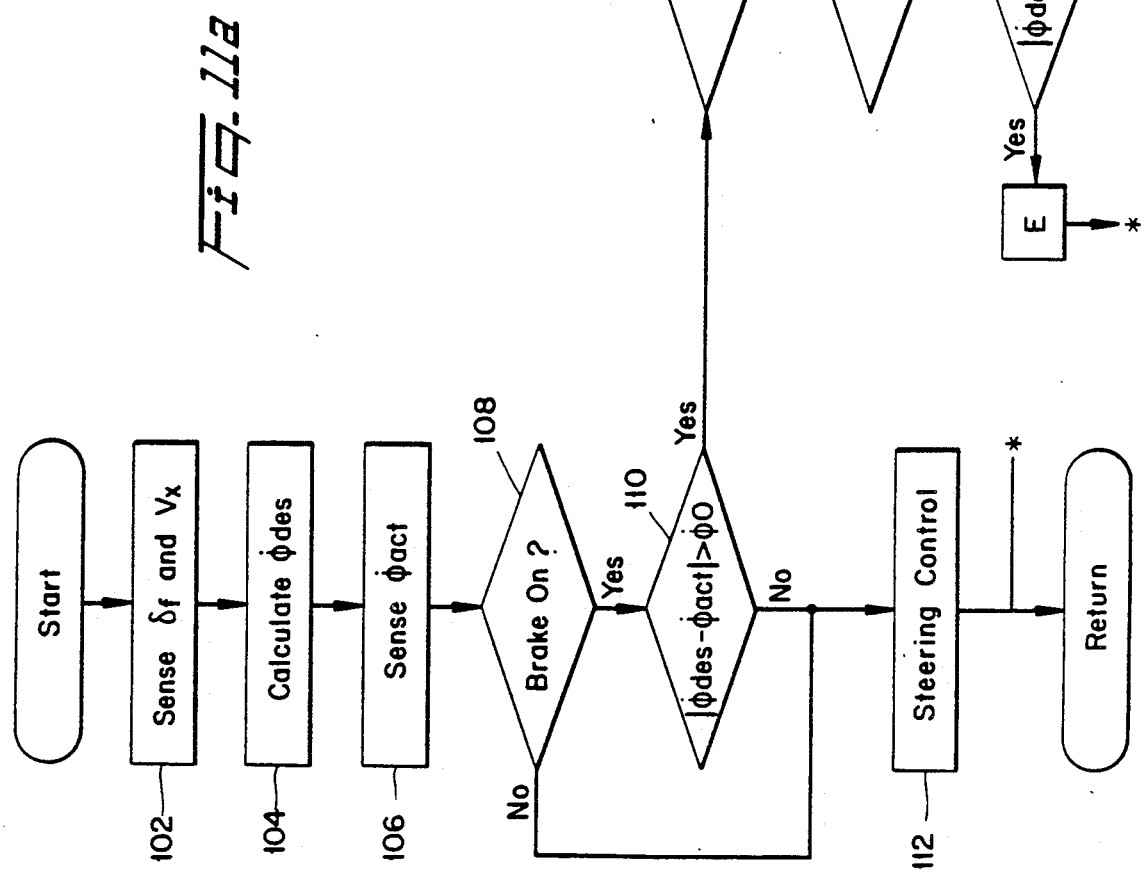

Referring to FIG. 11a, in steps 102-106 a lateral acceleration or yaw rate error is determined as previously described. Steering control is continuously performed on the basis of the lateral acceleration or yaw rate error either in a steering control step 112 or in one of combined steering and braking control steps A–F. In steps 108 and 110, it is determined whether the brakes are being operated and whether the lateral acceleration or yaw rate error exceeds a predetermined threshold $\phi_0$. If both conditions are satisfied, the braking control algorithm is begun in step 114. Otherwise, steering control is executed in step 112. Steps 114 and 116 considered together determine whether the steering angle $\delta_f$ is positive (to the right), negative (to the left) or zero (straight ahead).

Subsequently, in steps 118-122, it is determined whether the actual lateral acceleration or yaw rate is greater than the desired lateral acceleration or yaw rate, corresponding to an oversteer condition, or whether the opposite is true, corresponding to an understeer condition. In step 122, since the steering angle is straight ahead, the desired lateral acceleration or yaw rate is zero. According to the result of decision steps 118-122, one of the steering and braking control routines illustrated in the table of FIG. 11 is executed. The steering control portion of the two routines is identical and consists of applying the front and/or rear steering correction factors $\delta_{fc}$ and $\delta_{rc}$. In all other respects, the control routines are complements, i.e., one may be derived from the other by interchanging the "r" and "l" as they occur in the second of the two subscript positions in the double subscript notation used in the table of FIG. 11b. The subscripts fr, fl, rr and rl designate the front right, front left, rear right and rear left brake, respectively. In each control routine, any of four alternative measures may be taken depending on whether four brakes or two brakes are to be controlled and whether brake fluid pressure P or slip rate threshold $\lambda$ is used as the control variable. In the latter case, the slip rate threshold is increased or decreased from a nominal value calculated in accordance with one of the following equations:

$$\lambda = \lambda_{max} - \kappa_5 |\phi_{des} - \phi_{act}|$$

$$\lambda = \lambda_{max} - \kappa_6 |\alpha_{des} - \alpha_{act}|$$

where $K_5$, $K_6$ are certain values.

According to conditions A, C and E, corresponding to a right understeer, a left oversteer or a neutral steer condition with a yaw moment to the left, the brake pressure or slip rate threshold of one or both left brakes is reduced while the brake pressure or slip rate threshold of the brake or brakes directly opposite is increased. The slip rate threshold cannot be increased beyond a maximum value $\lambda_{max}$ and is therefore held when it reaches this value. Similarly, brake pressure is not increased beyond a point where an anti-lock feature becomes active. In that case, increased pressure would simply be dissipated by operation of the anti-lock proportioning valve. Whereas FIG. 11 assumes yaw rate is measured, FIG. 12 illustrates the case where lateral acceleration is instead measured.

According to conditions B, D and F, corresponding to a left understeer, a right oversteer or a neutral steer condition with a yaw moment to the right, the brake pressure or slip rate threshold of one or both right brakes is reduced while the brake pressure or slip rate threshold of the brake or brakes directly opposite is increased.

It will be appreciated that by compensating for undesirable lateral acceleration or yaw rate by means of both steering control and braking control, the desired response may be more quickly achieved. Furthermore, since less of the compensation has to be performed by the braking control system, stability may be achieved without increasing braking distance.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for controlling steering and braking of a vehicle in motion having brakes and a steering mechanism, and further having an actual yaw rate defined as the sideward velocity of the vehicle and a lateral acceleration defined as the sideward acceleration of the vehicle, and with respect to which one of a desired yaw rate, defined as the desired sideward velocity of the vehicle according to a control algorithm, and a desired lateral acceleration, defined as the desired lateral acceleration of the vehicle according to a control algorithm, is ascertained, comprising the steps of:
   measuring one of said actual yaw rate and said actual lateral acceleration;
   deriving a corresponding one of said desired yaw rate and said desired lateral acceleration according to said control algorithm;
   determining the corresponding one of a yaw rate error, defined as the difference between said actual yaw rate and said desired yaw rate, and a lateral acceleration error, defined as the difference between said actual lateral acceleration and said desired lateral acceleration; and
   controlling steering and braking of said vehicle to reduce said one of said yaw rate error and said lateral acceleration error, whereby braking distance is reduced below a braking distance obtained using braking control alone to reduce said one of said yaw rate error and said lateral acceleration error.

2. The method of claim 1 wherein steering of two wheels of said vehicle is controlled.

3. The method of claim 1 wherein braking of two wheels of said vehicle is controlled.

4. The method of claim 1 wherein steering of four wheels of said vehicle is controlled.

5. The method of claim 1 wherein braking of four wheels of said vehicle is controlled.

6. The method of claim 1 wherein steering is controlled using steering correction factors proportional to said one of said lateral acceleration error and said yaw rate error.

7. The method of claim 6 wherein a graph of a respective proportionality factor of each of said steering correction factors versus said one of said lateral acceleration error and said yaw rate error exhibits inverse symmetry about a set of orthogonal coordinate axes such that said proportionality factor is of equal magnitude but opposite sign on opposite sides of one of said axes.

8. The method of claim 1 wherein brake pressure is applied to said brakes through a modulating device, and braking is controlled by influencing one of said brake pressure and a brake slip threshold of said modulating device.

9. The method of claim 1 wherein steering and braking are both controlled when brakes of said vehicle are being operated and said one of said lateral acceleration error and said yaw rate error is greater than a predetermined threshold amount, and only steering is controlled when said brakes are not being operated and when said brakes are being operated but said error is less than a predetermined threshold amount.

10. The method of claim 1 wherein braking is controlled to reduce one of a rightward error and a leftward error relative to a direction of travel of said vehicle.

11. The method of claim 10 wherein said rightward error is reduced by one of (1) reducing brake pressure of wheels on a rightward side of said vehicle while increasing brake pressure of brakes on a leftward side of said vehicle and (2) reducing said brake slip threshold of brakes on a rightward side of said vehicle while increasing said brake slip threshold of wheels on a leftward side of said vehicle.

12. The method of claim 11 wherein said rightward error is reduced when one of (1) a right oversteer condition, (2) a left understeer condition and (3) a neutral steering condition accompanied by a rightward error exists.

13. The method of claim 11 wherein brake pressure is not increased beyond a pressure at which an anti-lock feature of said brakes becomes operative.

14. The method of claim 11 wherein said leftward error is reduced when one of (1) a left oversteer condition, (2) a right understeer condition and (3) a neutral steering condition accompanied by a leftward error exists.

15. The method of claim 10 wherein said leftward error is reduced by one of (1) reducing brake pressure of wheels on a leftward side of said vehicle while increasing brake pressure of brakes on a rightward side of said vehicle and (2) decreasing said brake slip threshold of brakes on a leftward side of said vehicle while increasing brake slip of wheels on a rightward side of said vehicle.

16. The method of claim 15 wherein brake pressure is not increased beyond a pressure at which an anti-lock feature of said brakes becomes operative.

17. A steering and braking control apparatus for a vehicle with respect to which an actual yaw rate is defined as the sideward velocity of the vehicle and a lateral acceleration defined as the sideward acceleration of the vehicle, and with respect to which one of a desired yaw rate, defined as the desired sideward velocity of the vehicle according to a control algorithm, and a desired lateral acceleration, defined as the desired lateral acceleration of the vehicle according to a control algorithm, is ascertained, comprising:
  steering angle regulating means for controlling a steering angle of said vehicle;
  brake pressure regulating means for controlling brake pressure of said vehicle;
  control means for controlling said steering angle regulating means and said brake pressure regulating means; and
  means for determining and sending to said control means one of a yaw rate error, defined as the difference between said actual yaw rate and said desired yaw rate, and a lateral acceleration error, defined as the difference between said actual lateral acceleration and said desired lateral acceleration, said control means controlling said steering angle regulating means and said brake pressure regulating means according to said one of said yaw rate error and said lateral acceleration error.

18. The steering and braking control apparatus of claim 17 wherein said means for determining comprises steering wheel angle sensing means, vehicle speed sensing means, and one of yaw rate sensor means and lateral acceleration sensor means.

19. The steering and braking control apparatus of claim 18 wherein said determining means determines said one of said yaw rate error and said lateral acceleration error by determining one of a desired yaw rate and a desired lateral acceleration rate using outputs of said steering wheel angle sensing means and said vehicle speed sensing means and by comparing said one of said desired yaw rate and said desired lateral acceleration rate with an output of said one of said yaw rate sensor means and said lateral acceleration sensor means.

20. The steering and braking control apparatus of claim 19 wherein said steering angle regulating means comprises one of a servo control system powered by a hydraulic cylinder and a pulse control system powered by a DC motor.

21. The steering and braking control apparatus of claim 19 wherein said brake pressure regulating means comprises a proportioning valve for anti-lock braking.

* * * * *